United States Patent
Hart et al.

[11] Patent Number: 5,544,518
[45] Date of Patent: Aug. 13, 1996

[54] APPARATUS AND METHOD FOR CALIBRATING MANIFOLDED TANKS

[75] Inventors: Robert P. Hart, East Hampton, Conn.; Leonid M. Malinin, Cambridge, Mass.

[73] Assignee: Veeder-Root Company, Simsbury, Conn.

[21] Appl. No.: 459,122

[22] Filed: Jun. 2, 1995

[51] Int. Cl.⁶ .................................................. G01M 3/04
[52] U.S. Cl. ........................ 73/1 H; 73/49.2; 364/571.02
[58] Field of Search ...................... 73/1 H, 149, 49.2 T; 364/509, 571.02

[56] References Cited

U.S. PATENT DOCUMENTS

| | | | |
|---|---|---|---|
| 3,841,146 | 10/1974 | Cross et al. | 73/49.2 |
| 4,006,635 | 2/1977 | Khoi | 73/302 |
| 4,186,591 | 2/1980 | Mooney | 73/49.2 |
| 4,250,750 | 2/1981 | Martinec et al. | 73/308 |
| 4,349,882 | 9/1982 | Asmundsson et al. | 364/509 |
| 4,386,525 | 6/1983 | Mooney | 73/49.2 |
| 4,445,627 | 5/1984 | Horak | 222/54 |
| 4,528,839 | 7/1985 | Blanchard et al. | 73/1 H |
| 4,555,941 | 12/1985 | Fathauer et al. | 73/304 C |
| 4,571,987 | 2/1986 | Horner | 73/49.2 |
| 4,589,077 | 5/1986 | Pope | 364/509 |
| 4,590,575 | 5/1986 | Emplit | 364/509 |
| 4,646,560 | 3/1987 | Maresca, Jr. et al. | 73/49.2 |
| 4,649,739 | 3/1987 | Horner | 73/49.2 |
| 4,672,842 | 6/1987 | Hasselmann | 73/49.2 |
| 4,679,425 | 7/1987 | Bolland | 73/49.2 |
| 4,716,536 | 12/1987 | Blanchard | 364/571 |
| 4,732,035 | 3/1988 | Lagergren et al. | 73/49.2 |
| 4,736,329 | 4/1988 | Ferretti et al. | 364/509 |
| 4,748,846 | 7/1988 | Haynes | 73/290 V |
| 4,788,648 | 11/1988 | Ferretti et al. | 364/509 |
| 4,796,469 | 1/1989 | Brown et al. | 73/49.2 |
| 4,807,464 | 2/1989 | Janotta | 73/49.2 |
| 4,811,601 | 3/1989 | Tolan | 72/29 B |
| 4,819,483 | 4/1989 | Emplit et al. | 73/304 C |
| 4,827,762 | 5/1989 | Hasselmann | 73/49.2 |
| 4,840,056 | 6/1989 | Fernandez et al. | 73/1 H |
| 4,847,794 | 7/1989 | Hrubes | 364/571.04 |
| 4,850,223 | 7/1989 | Carlin et al. | 73/49.2 |
| 4,852,054 | 7/1989 | Mastandrea | 364/509 |
| 4,893,498 | 1/1990 | Jensen | 73/49.2 |
| 4,896,282 | 1/1990 | Orwell | 364/571.05 |
| 4,908,783 | 3/1990 | Maier | 364/560 |
| 4,914,943 | 4/1990 | Lagergren | 73/49.2 |
| 4,945,756 | 8/1990 | Lewis et al. | 73/49.2 |
| 4,954,973 | 9/1990 | Jacob et al. | 364/551.01 |
| 4,964,296 | 10/1990 | Jensen | 73/49.2 |
| 4,972,710 | 11/1990 | Uhlarik et al. | 73/292 |
| 4,977,528 | 12/1990 | Norris | 364/571.04 |
| 4,986,113 | 1/1991 | Harrison et al. | 73/49.2 |
| 5,035,141 | 7/1991 | Baird et al. | 73/296 |
| 5,056,017 | 8/1991 | McGarvey | 364/403 |

(List continued on next page.)

FOREIGN PATENT DOCUMENTS

| | | | |
|---|---|---|---|
| 3326719A1 | 1/1984 | Germany | G01F 23/00 |
| 617008A5 | 12/1978 | Switzerland | G01F 23/00 |
| 2138947 | 10/1984 | United Kingdom | G01F 25/00 |

*Primary Examiner*—Robert Raevis
*Attorney, Agent, or Firm*—Arnold, White & Durkee

[57] ABSTRACT

An apparatus and method are provided for calibrating manifolded liquid storage tanks. The apparatus includes sensors disposed within the tanks for sensing the liquid levels in each of the tanks and a metering device for measuring the amount of liquid dispensed into or out of the storage tanks. A processor is also provided which determines the amount of liquid dispensed from each tank based on liquid level measurements obtained during idle periods following dispensing periods. Once this information is obtained, single tank calibration techniques are employed. An alternate combined tank calibration can also be used. This method does not separate out the amount of liquid dispensed from each tank, but rather utilizes the combined amount dispensed. From this simpler, but less accurate method, an "equivalent" combined tank chart or combined mathematical formula may be generated using the metered amounts and a combined height amount. Heights from the two tanks may be simply averaged. The processor may be programmed to perform either or both methods.

18 Claims, 7 Drawing Sheets

U.S. PATENT DOCUMENTS

| | | | |
|---|---|---|---|
| 5,075,877 | 12/1991 | Jacob et al. | 364/550 |
| 5,086,644 | 2/1992 | Schendel | 73/49.2 |
| 5,088,317 | 2/1992 | Jensen | 73/49.2 |
| 5,131,264 | 7/1992 | Jensen | 73/49.2 |
| 5,263,371 | 11/1993 | Maresca, Jr. et al. | 73/290 V |
| 5,297,423 | 3/1994 | Keating et al. | 73/49.2 |
| 5,309,760 | 5/1994 | Watanabe et al. | 73/149 |
| 5,319,545 | 6/1994 | McGarvey et al. | 364/403 |

APPARATUS AND METHOD FOR CALIBRATING MANIFOLDED TANKS

FIELD OF THE INVENTION

The present invention relates generally to techniques for calibrating systems designed to determine the amount of material in a storage tank, and more particularly, is directed to a technique for continuous and automatic calibration of a system designed to determine the amount of liquid in manifolded tanks (i.e., tanks in fluid communication with each other).

BACKGROUND OF THE INVENTION

Liquid siphon tank manifolding is a common method used at retail fueling sites and elsewhere to increase the total storage capacity available for any one fuel type. Reconciliation methods used for tracking tank system integrity require highly accurate tank calibration charts to minimize discrepancies when reconciling dispensing meter amounts against tank readings. A tank chart, also known as a tank strap chart, is used to convert tank fuel height readings, in inches, to volume, in gallons, which are needed to compare to the metered volumes which are also in gallons. Currently, no convenient method exists to provide the highly accurate tank calibration charts needed for reconciliation when tanks are manifolded together.

Tank manifolding is especially convenient in the United States since the recent changeover from leaded fuel to unleaded fuel left site owners with, typically, three tanks in the ground to handle only two types of fuel. Previously, separate tanks were needed for low grade leaded, low grade unleaded, and high grade (typically unleaded). Now only low grade and high grade unleaded fuels are needed. Midgrades can be blended from the high and low grade unleaded fuels. Since low grade generally out-sells high grade by a two to one factor, the extra tank can be manifolded to the low grade tank to handle the demand by doubling the storage capacity. This presents a problem for current methods of tank calibration which can only be used with single tanks.

Known single tank calibration techniques measure the drop in tank fuel height during dispensing periods and compare the volume changes associated with the height drop to the amount of fuel dispensed through dispensing meters during these periods. Actual gallons per inch contained in the tank can be identified at various tank heights by using the metered volume versus tank height drop ratios, or (gallons per inch=dV/dh=(metered volume in gallons/height drop in inches) at height h). Since dV/dh varies with tank height, h, these data are accumulated over a range of fuel heights during normal tank activity. When adequate data are accumulated, a tank calibration may be performed by adjusting the existing tank chart, or creating a new tank chart. Various techniques are available to use the data to perform this function.

The data available from manifolded tank systems for calibration purposes includes the same metered volumes and height drops, but in this case, height drops are available from both tanks. This causes the problem of choosing which tank to attribute the amounts dispensed. All of the fuel does not come from just one tank. In fact, both tanks supply the fuel due to the manifolded siphon which eventually allows the levels to even out between the tanks. This takes time due to the fast rates of dispensing relative to the limited size of the siphoning action. However, the time available to take the fuel height readings typically does not allow for a long enough settling period to ensure that the fuel heights are equal between the tanks. Even if settled or static heights were available, it still cannot be determined how much metered fuel to attribute to each tank.

The present invention is directed at providing a solution to the above problem.

SUMMARY OF THE INVENTION

In one aspect of the present invention, an apparatus is provided for calibrating manifolded liquid storage tanks. The apparatus includes sensors for sensing liquid levels in each of the tanks and providing first and second output signals for receipt by a processor. The sensors include a pair of capacitance probes or a pair of magneto-strictive probes. Each probe is disposed within a different tank. The apparatus further includes a metering device for measuring the amount of liquid dispensed into or out of the storage tanks and providing third output signals for receipt by the processor.

The processor is operative to store a first set of data values including a plurality of ratios of changes in liquid levels in one tank to associated changes in liquid levels in the other tank. The liquid levels used in determining the changes in liquid levels are measured by the sensors during a plurality of idle periods following associated dispensing periods and at a plurality of different liquid levels of the liquid in the tanks. The processor is further operative to determine the dimensions of the tank based on a second set of data values which represent the amount of liquid dispensed into or out of each tank during a plurality of dispensing periods. The processor is programmed with an algorithm to compute the amount of liquid dispensed into or out of each tank based on liquid level measurements made immediately before dispensing and immediately following dispensing. The algorithm employs a mathematical formula for computing the volumes of the liquid in each of the tanks immediately prior to dispensing and immediately following dispensing. The computed volumes are used in determining the amount of liquid dispensed into or out of each tank during the dispensing periods. The mathematical formula is based on the height of the liquid in the tanks at the dispensing periods and the dimensions of the tanks. The processor is further operative to store a third set of data values corresponding to the amounts of liquid dispensed into or out of each tank during the plurality of dispensing periods. The third set of data values is determined using the liquid level ratios corresponding to the heights of the liquid in the tanks at the dispensing periods.

In an alternate embodiment of the present invention, the processor is operative to determine the dimensions of the tank based on a second set of data values which represent the differential amount of liquid dispensed into or out of each tank per unit of differential height change during a plurality of dispensing periods. The processor is programmed with an algorithm to compute the differential amounts of liquid dispensed into or out of each tank per unit for differential height change based on the liquid level measurements. The algorithm employs a mathematical formula for computing the differential amount of liquid dispensed into or out of each tank per unit of differential height change. The mathematical formula is based on the liquid level measurements and the dimensions of the tanks. In this embodiment of the present invention, the processor is further operative to store a third set of data values including a plurality of ratios of changes in volumes to associated changes in liquid levels for each tank. The liquid level measurements used in determining the associated changes are taken by the sensors during a corresponding plurality of dispensing periods. Each change in volume is a function of the change in liquid level ratio corresponding to the liquid level at or near which the change in volume is determined and the amount of liquid dispensed which is measured by the metering device during the dispensing period at which the change in volume is being determined.

In accordance with the present invention, a non-linear curve fitting routine is utilized to derive the dimensions of the tank. The processor is preferably programmed with this routine. The routine searches for the dimensions of the tank by fitting the third set of data points (either differential volumes $dV_i$ or derivatives $dV/dh_i$ vs. $h_i$, where i=1, 2, ... , N, and i is the number of a data point, and N is the total number of data points), to an analytical model, expressing either volume V or its derivative $dV/dh$ as a function of height h and the dimensions of the tank. These functions are given in Appendices B (V=V(h, dimensions)) and C ($dV/dh$=$dV/dh$(h,dimensions)), respectively. Since said models are non-linear with respect to the dimensions of the tank, a non-linear curve fitting routine is required. The routine searches for the dimensions, delivering minimum to the sum of the squares of residuals (SSR) between the measured (either $dV_i$ or $dV/dh_i$) and the estimated (either $dV_i$ or $dV/dh_i$) values, with the constraints imposed on these dimensions (e.g., the end shape of the tank can only vary between 0 and 1). Those skilled in the art will recognize that said routine may take many forms and embodiments. Commercially available examples of a constrained minimization routine which can be applied to the problem of non-linear curve fitting are included in: Optimization Toolbox, available from The MathWorks, Inc., 24 Prime Park Way, Natick, Mass., 01760, U.S.A.; and NAG C Library, available from Numerical Algorithms Group, 1400 Opus Place, Suite 200, Downers Grove, Ill., 60515, USA.

Since the measured data are likely to include outliers (the experimental points that are substantially inaccurate), methods of robust estimation need to be applied along with said routine to eliminate them. Again, these methods may take many forms. E.g., the removal of outliers can proceed as follows. On each iteration, a curve is fitted to the data points, using the constrained minimization routine, and standard deviation of residuals is calculated. Then, the confidence intervals around the fitted curve of width $$width = \alpha \cdot (standard\ deviation\ of\ residuals)$$

are drawn, $\alpha$ being an input "width parameter," e.g., $\alpha$=3. All experimental points beyond these intervals are qualified as outliers and removed. Then, the curve is fitted to the remaining points. The iterations converge when certain consistency is reached (e.g., no more than 1% of the points are removed on the n-th iteration. In this case, consistency is 0.99).

In an alternate embodiment, the processor is operative to determine the dimensions of the tank based on a first set of data values which represent the amount of liquid dispensed into or out of the manifolded tanks corresponding to predetermined liquid levels in the tanks as sensed by the sensors. The processor is programmed with an algorithm for computing the first data values from the liquid level measurements. The processor in this embodiment also stores a second set of data values derived from the third output signals. The second set of data values correspond with actual volumetric quantities of metered liquid, which volumetric quantities are related to the predetermined liquid levels. The processor then finds the dimensions of the tank using the constrained minimization routine referred to above.

In another aspect of the present invention, a method is provided for calibrating manifolded liquid storage tanks. The method includes the step of generating a first set of data values including a plurality of ratios of changes in liquid levels in one tank to associated changes in liquid levels in the other tank. The liquid levels used in determining the changes in liquid levels are measured during a plurality of idle periods following a corresponding plurality of dispensing periods and at a plurality of different liquid levels of the liquid in the tanks. The method further includes the step of generating a second set of data values which represent estimates of the amount of liquid dispensed into or out of each tank during a plurality of dispensing periods. The step of generating the second set of data values is carried out using the algorithm described above to compute the amount of liquid dispensed into or out of each tank based on the liquid level measurements made immediately before dispensing and immediately following dispensing. The method further includes the step of generating a third set of data values corresponding to the amounts of liquid dispensed into or out of each tank during the plurality of dispensing periods. The third set of data values are determined using the liquid level ratios corresponding to the heights of the liquid in the tanks at the dispensing periods.

In art alternate method, a second set of data values are generated which represent estimates of the differential amount of liquid dispensed into or out of each tank per unit of differential height change during a plurality of dispensing periods. The step of generating the second set of data values uses an algorithm to compute the differential amount of liquid dispensed into or out of each tank per unit of differential height based on the liquid level measurements. The method further includes the step of generating a third set of data values including a plurality of ratios of changes in volumes to associated changes in liquid levels for each tank. The liquid level measurements used in determining the associated changes are taken during a corresponding plurality of dispensing periods. Each change in volume is a function of the change in liquid level ratio corresponding to the liquid level at or near which the change in volume is determined and the amount of liquid dispensed which is measured by the metering means during the dispensing period at which the change in volume is being determined.

Either or both methods may employ the constrained minimization routine with removal of outliers referred to above.

Yet another alternate method of calibrating manifolded tanks is provided. This method includes the step of generating a first set of data values which represent estimates of the amount of liquid dispensed into or out of the manifolded tanks corresponding to predetermined liquid levels in the tanks. The step of generating the first set of data values is carried out using an algorithm for computing the first data values from the liquid level measurements. The method further includes the step of generating a second set of data values corresponding to the amount of liquid dispensed into or out of the tanks as measured by the metering device. The actual volumetric quantities of metered liquid quantities is related to the predetermined liquid levels. The algorithm employs at least one mathematical expression for computing the first data values from the predetermined liquid levels based on the dimensions of the tanks. The constrained minimization routine with removal of outliers can then be applied to the two sets of data, as described above.

BRIEF DESCRIPTION OF THE DRAWINGS

The foregoing and other features of the present invention will be best appreciated with reference to the detailed description of the invention, which follows when read in conjunction with the accompanying drawings, wherein:

FIG. 2B is an enlarged view of FIG. 2A.

FIG. 3A is an enlarged view of FIG. 3B.

DETAILED DESCRIPTION OF THE PREFERRED EMBODIMENTS

Figure 1:
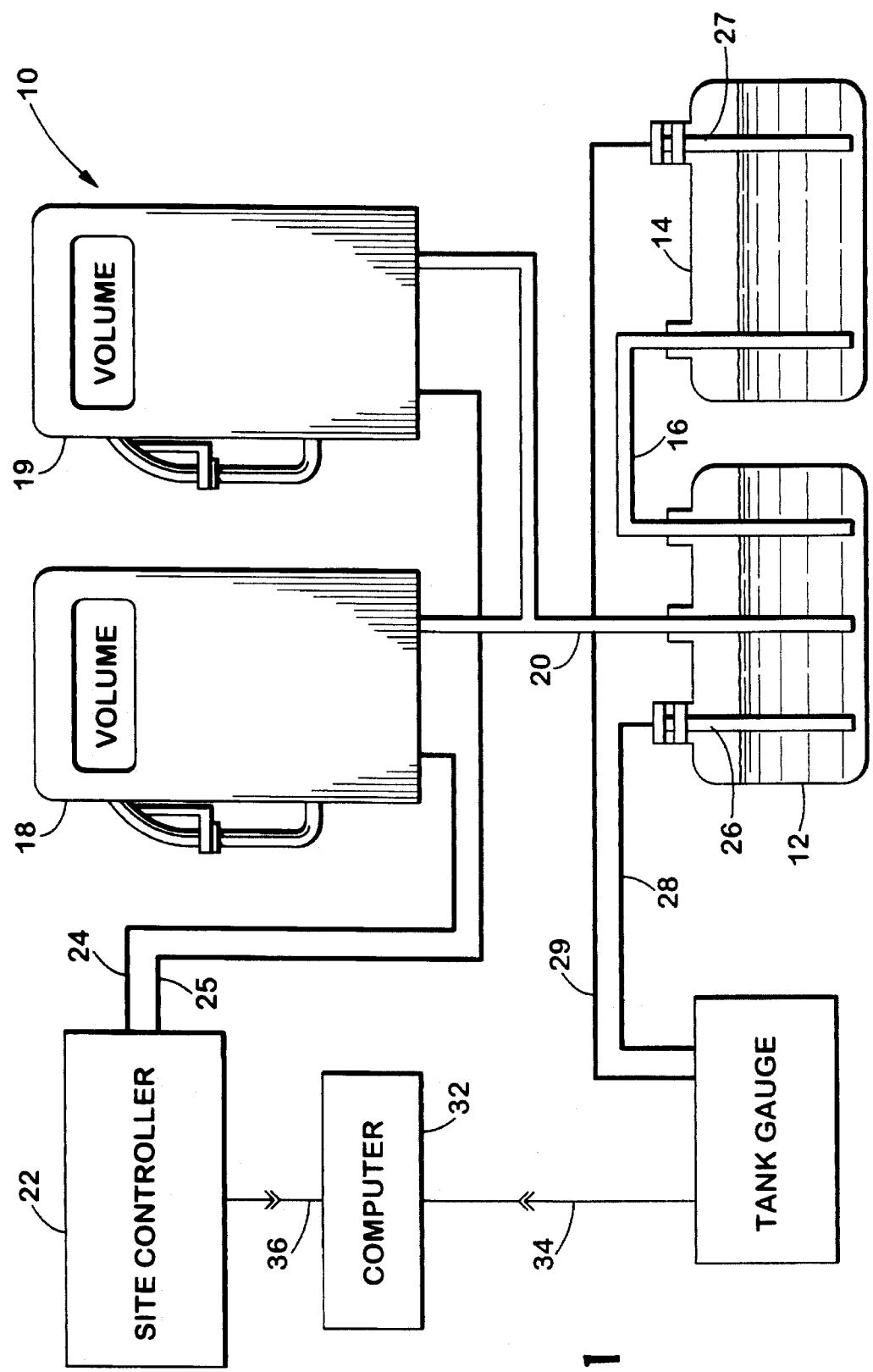
FIG. 1 is a schematic diagram of a fuel dispensing system embodying the present invention.

Turning now to the drawings and referring initially to FIG. 1, a fuel dispensing system having a pair of manifolded tanks is shown generally by reference numeral 10. The fuel dispensing system 10 includes two liquid storage tanks 12 and 14 connected by a syphon pipe 16. The liquid storage tanks 12 and 14 store identical liquids, for example gasoline of the same octane, and are of a conventional construction. The storage tanks 12 and 14 are typically cylindrically shaped and have flat, spherical, or elliptical ends. They are formed of steel or a fiberglass material. The siphon pipe 16 transfers liquid between the storage tanks 12 and 14 when the levels in the tanks are at different heights.

A pair of dispensers 18 and 19 are connected to the liquid storage tank 12 via a dispensing line 20. The dispensers 18 and 19 are of a conventional construction. They include a pump, valves and a metering device for metering the quantities of fuel dispensed and may be two of several dispensers connected to a site controller 22. As one of ordinary skill in the art will recognize, the dispensers 18 and 19 can be connected to other tanks. The site controller 22 is of conventional construction and includes means for displaying the volumes and costs of amounts dispensed by each dispenser and the total volume dispensed by every dispenser connected to the same tank or tanks. The latter means includes conventional circuitry for providing data, i.e., meter readings corresponding to the total volumes dispensed. This information is provided to the site controller 22 via communication lines 24 and 25 which are connected to the dispensers 18 and 19, respectively.

The present invention is directed to a manifolded tank calibration system. The system includes the metering devices which are connected via the communication lines 24 and 25 to the site controller 22. It also includes a pair of tank level sensors 26 and 27, of known construction, which are installed in the liquid storage tanks 12 and 14, respectively. Each of the tank level sensors 26 and 27 includes a transducer (e.g. magneto-strictive or multiple capacitance probe) which provides electrical signals in response to changes in the level of the liquid within the storage tanks. Examples of such tank level sensing devices include MAG1 and MAG2 Magnetostrictive Probes available from Veeder Root, 125 Powder Forest Drive, Simsbury, Conn., 06070, U.S.A.

The liquid level signals from the sensors 26 and 27 are communicated via communication lines 28 and 29, respectively, to a tank gauge 30. The liquid level signals from the level sensors 26 and 27 are then supplied to a computer 32 via communication line 34. The computer 32 also receives data signals from the site controller 22 via communication line 36 representing the "metering value" or total volumetric amount of fuel dispensed by the dispensers 18 and 19 connected to the tanks 12 and 14. The computer 32 includes a microprocessor and may also include one or more A/D (analog to digital) converters as required, i.e., if the signal inputs are in analog rather than digital form. The tank gauge 30, which displays the amounts of material in each of the storage tanks 12 and 14, relays the liquid level signals from the sensors 26 and 27 to the computer 32 via the communication line 34. The tank gauge 30 may optionally be connected to a printer (not shown).

The meter readings communicated from the site controller 22 together with the liquid levels measured by the sensors 26 and 27 may be used to derive calibration data for the tanks 12 and 14. This derivation is accomplished by the microprocessor of the computer 32 which is programmed to handle the tasks, outlined above: generating the individual ratio points by fitting the segments shown in FIGS. 2A and 2B, fitting the ratio points as a function of the equivalent height applying the nonlinear curve fitting routine (FIG. 3), and dividing the transactions between the two tanks. The calibration further involves fitting the differential volumes (as such or per unit of differential length) vs. height (the curves shown in FIG. 4) for every single tank using the same non-linear curve fitting routine.

The microprocessor may be programmed to generate sets of data used in calibrating the tanks 12 and 14 as follows. First, liquid levels, as detected by the sensors 26 and 27, in each of the tanks 12 and 14 are collected during idle periods following dispensing periods (or delivery periods). From this information, the ratio of the derivatives (dV/dh) between the two tanks 12 and 14 can be determined. That is:

$$\text{Ratio}, R = \frac{\left(\frac{dv}{dh}\right)_{tank1}}{\left(\frac{dv}{dh}\right)_{tank2}}$$

During the time following dispensing, it is not known how many gallons are moving from one tank to the other, but it is known that the amount leaving one tank exactly equals the amount entering the other over any given time period. The following ratio can then be formed (ignoring signs, since only the absolute value $|dV/dh|$ matters):

$$R = \frac{\left(\frac{dv}{dh}\right)_{tank1}}{\left(\frac{dv}{dh}\right)_{tank2}} = \frac{\left(\frac{dv_{tank1}}{dh_{tank1}}\right)}{\left(\frac{dv_{tank2}}{dh_{tank2}}\right)} = \frac{dh_{tank2}}{dh_{tank1}}$$

since during an idle period, $$dv_{tank1} = dv_{tank2}$$

Since R varies over tank height, fairly sophisticated methods must be used to combine all the $dh_{tank2}/dh_{tank1}$ data, reduce variability, and produce the continuous R curve versus height, h, or R(h) over the height range needed for separating meter data. These methods are outlined below.

Figure 2A:
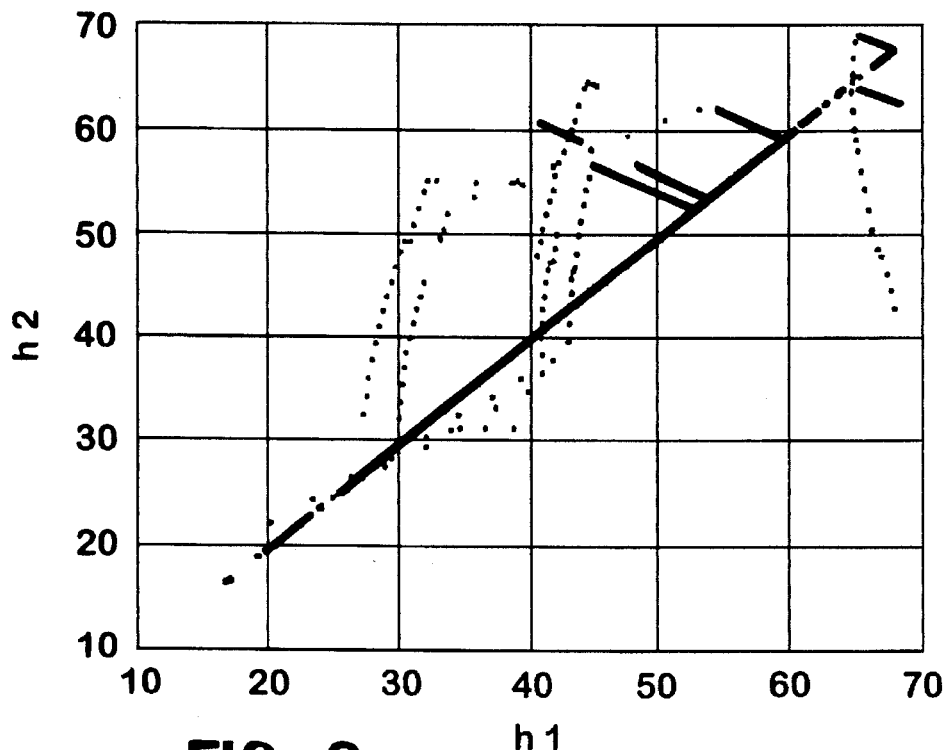
FIGS. 2A and 2B are graphs of actual liquid level measurements obtained from two tanks manifolded together during idle periods in accordance with the present invention, and shown in the plane ($h_1$, $h_2$), where $h_1$, $h_2$ are the measured fuel heights.
Figure 2B:
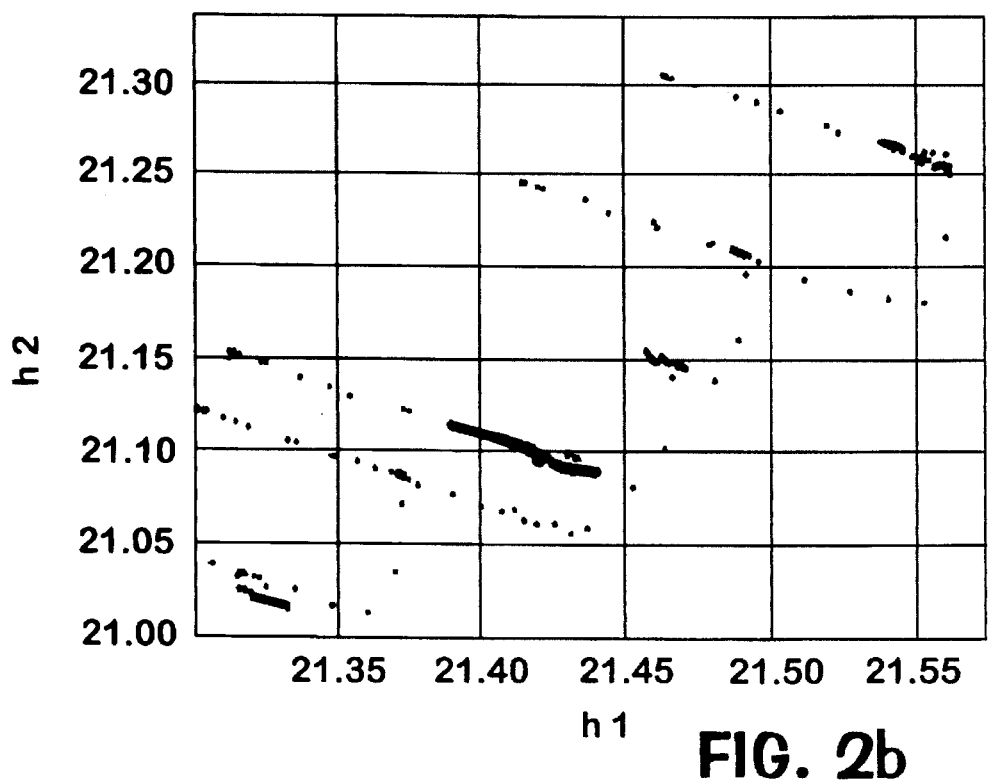

Once communicated to the computer 32, the liquid level height measurements are used to construct a file of the ratios, R, of $dh_{tank2}/dh_{tank1}$ between the two tanks 12 and 14 at a plurality of heights in the tanks taken at a plurality of idle periods. The liquid level measurements can be plotted in the ($h_1$, $h_2$) plane, as shown in FIG. 2A. FIG. 2A shows a plot of actual liquid level measurements taken in each tank during a plurality of idle periods. Individual segments (sequences of points), which can be seen in FIG. 2B, represent different idle periods. The slope of the segments, which can be seen in FIG. 2B, is equal to the ratio R. This slope is obtained by (in the simplest case) linear fitting said segments h2=f(h1). That is, each idle period can generate at least one ratio point. This slope (and ratio) is a function of the equivalent height $h_{eq}=0.5^*(h_1+h_2)$. A curve (which may be linear or non-linear) can be fitted to each of the data segments shown in FIGS. 2A and 2B. The slope of this curve at the point of its intersection with the line $h_1-h_2=\Delta h_s$ (which corresponds to the settled condition in the tanks) is equal to the ratio R for the given combination of ($h_1$, $h_2$). Obtained in this manner ratio points are plotted in FIGS. 3A and B which relates R as a function of h(idle). Standard linear regression analysis known to those of ordinary skill in the art, together with removal of outliers, can be applied to the data to generate a linear curve to fit the data.

While a linear curve will provide somewhat accurate R values for heights measured in the middle of the tanks, it will not provide very accurate R values for height measurements near the top and bottom of the tanks. A non-linear curve will need to be fitted to provide more accurate R values corresponding to measured heights near the top and bottom of the tanks. Appendix A provides a useful formula for providing a non-linear curve fit to the ratio points plotted in the graphs in FIGS. 3A and 3B which relate R as a function of h(idle). The non-linear function more accurately fits the data at the upper and lower ends of the tank.

Figure 3A:
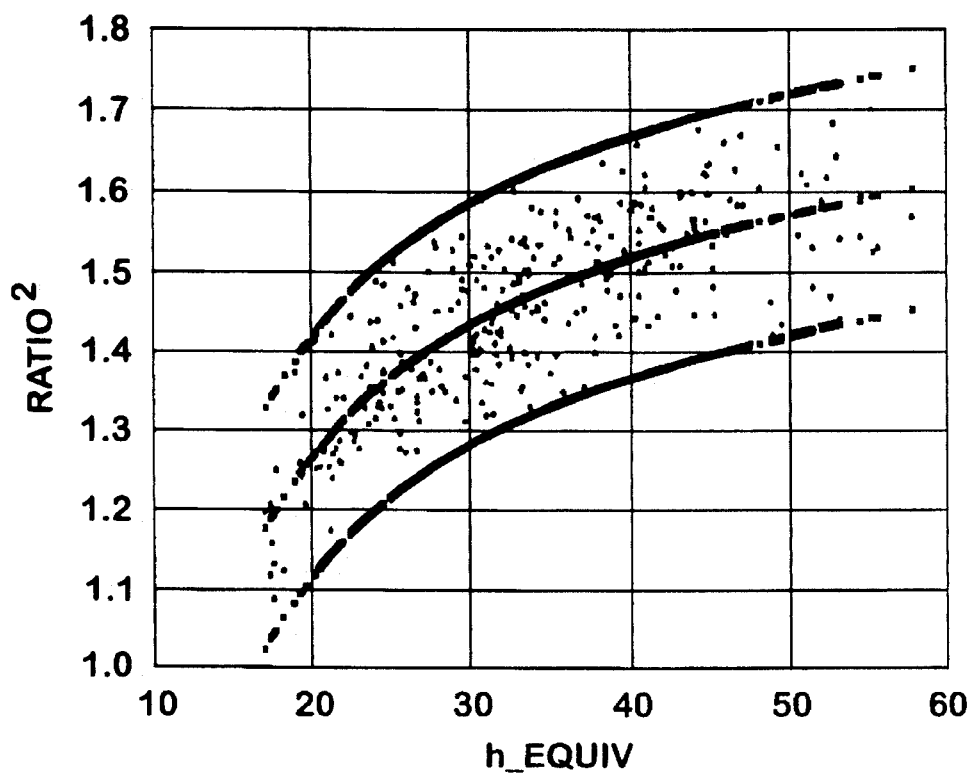
FIGS. 3A and 3B are graphs of the ratio points (squared) vs. equivalent height. Also shown is the curve fitted to the ratio points by the formula given in Appendix A and using the non-linear curve fitting routine described above.
Figure 3B:
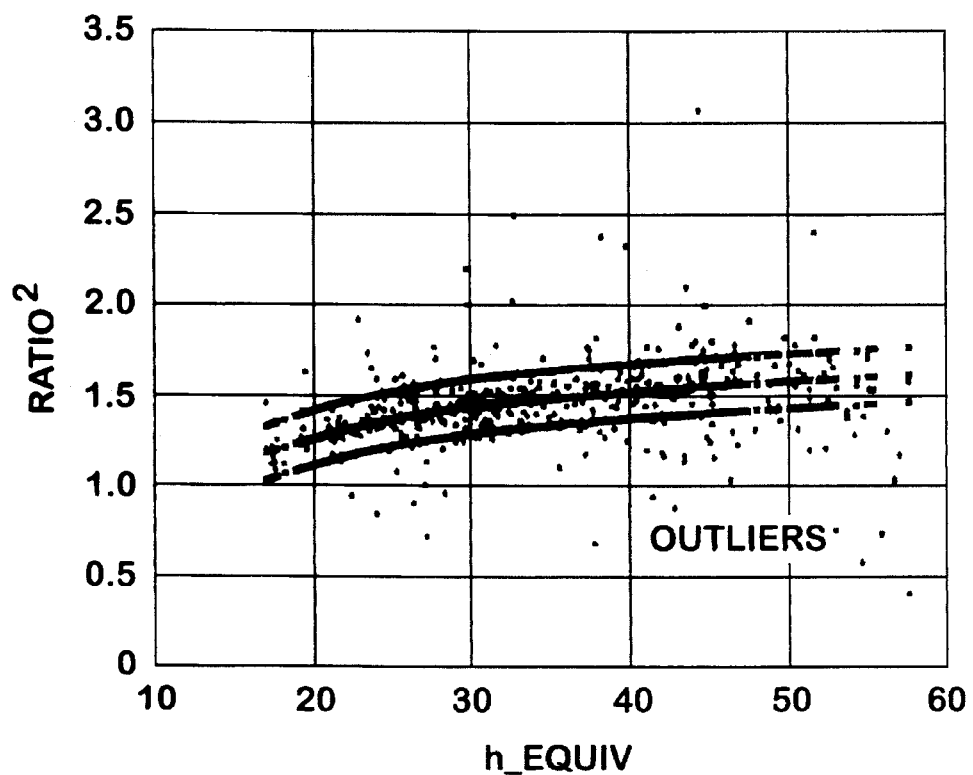

FIGS. 3A and 3B show graphs of the non-linear curve fit for actual data collected. The ratio $R^2$ is shown as a function of $h_{eq}$. FIGS. 3A and 3B also illustrate the process of removal of outliers. In both FIGS. 3A, 3B shown are the fitted curve, the upper bound and the lower bound. In FIG. 3B there is also a few outliers (the points beyond the bounds); these outliers were eventually removed, as can be seen in FIG. 3A, where the final fit is shown. The ratios R(h(busy)) can be obtained from the curves in FIGS. 3A and 3B which can in turn be used in calculating the primary calibration data as explained below.

To use the R curve for separating metered volume between the two tanks 12 and 14, an average, or "equivalent" height, $h_{eq}$, as well as any of the individual heights $h_1$, $h_2$, can be used as the R curve independent variable. R is (generated and) found for the heights, corresponding to the settled condition of the tanks. In the plane ($h_1$, $h_2$) these points belong to the line $h_1-h_2=\Delta h_s$, where $\Delta h_s$ is the settled height offset between the fluid levels in the two tanks. Measured static heights always settle to the same difference $\Delta h_s$ between the two tanks 12 and 14. Though fuel levels tend to become equal due to gravity, measurement probe readings have fixed offset due to, among other factors, non-equal tank depth.

Once the ratios R have been found, the volume dispensed can be separated between the two tanks and single tank calibration techniques can be applied to each tank. An example of such a calibration technique is provided in U.S. Pat. No. 4,977,528, the disclosure of which is hereby incorporated by reference. As those of ordinary skill in the art will recognize, alternate single tank calibration techniques may be utilized. A feasible calibration of a single tank may proceed as follows.

The separated differential volumes (dV) or the derivatives (dV/dh) can then be compared to the changes in volume in each tank as determined from the tank strap chart or from a mathematical formula based on the dimensions of the tank. The tank strap chart or equivalent mathematical formula are used to determine the volume of liquid in the tank based on the height of the liquid in the tank. In either case, a continuous curve of volumes (V) or derivatives (dV/dh) as a function of liquid level is plotted. By knowing the liquid level, the differential volume (dV) can be determined simply by subtracting the associated volumes on the chart. In the case of the mathematical formula, the volume of the liquid in the tank is expressed as a function of the height of the liquid in the tank and several geometric parameters associated with the tank (See Appendix B).

Figure 5:
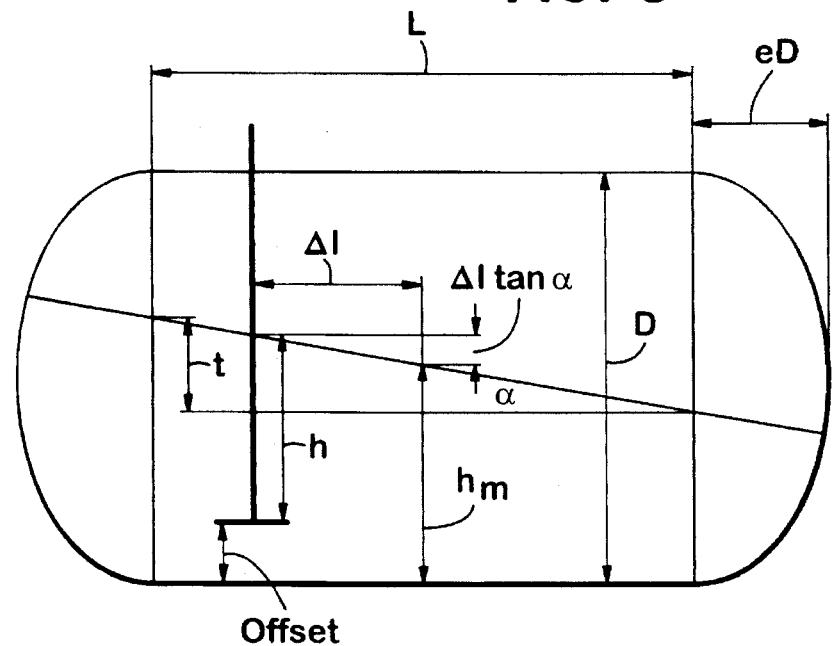
FIG. 5 is a diagram of the dimensions of a liquid storage tank used in the present invention.

More precisely, the mathematical expression is based on a set of 5 geometrical parameters. These parameters include the diameter (D) of the tank, the length (L) of the cylindrical part of the tank, the dimensionless end shape factor (e), the offset (O) which is the distance between the bottom of the tank and the bottom of the sensing probe, and the tilt (t). FIG. 5 shows the geometrical parameters of a standard cylindrical tank having elliptical ends. The end shape (e) determines the length (eD) of each ellipsoidal end and can take the values between 0 and 1. For example, for a tank with flat ends, e=0; and for a tank with spherical ends, e=1. The tilt of the tank is the elevation of the left end of (the cylindrical section of) the tank over the right end (or vise-versa). Typically, the tanks are mounted with some tilt so that water can accumulate at the lower end.

The fuel height $h_m$ in the middle of the tank, used to calculate the volume, is not directly available and is determined as $$h_m = h + O - \Delta l \tan \alpha = h + O_1,$$

$$\alpha = a \sin (t/L),$$

where (referring to FIG. 5) h is the probe reading, O is the offset, $\Delta l$ is the distance between the probe and the middle of the tank, L is the length of the cylindrical part of the tank, and t is the tilt (in units of length). If there is no tilt, $O_1=O$; if there is a non-zero tilt, the combination $O_1$ can still be called the offset and obtained from the fitting process. The volume is obtained as $V=V_{left}+V_{right}+V_{middle}$, where $V_{left}$ is the volume of the liquid in the left end portion of the tank, $V_{middle}$ is the volume of the liquid in the middle (cylindrical) portion of the tank, and $V_{right}$ is the volume of the liquid in the right end portion of the tank. The formulas for calculating $V_{left}$, $V_{right}$, and $V_{middle}$ for tanks with and without a tilt are provided in Appendix B.

Using either the tank strap chart or the mathematical formulas, the method according to the present invention involves obtaining the volumes of the liquid in each of the tanks first at the instant before liquid is dispensed from the tanks, and then immediately after the liquid is dispensed. The difference between these two volumes ($dV_{estimated}$) is then determined and compared to the differential volumes in each tank (dV) which are determined using the ratio R. The non-linear constrained minimization routine, described above, is further applied to derive the dimensions of the tank.

Alternatively, rather than comparing the differences in volume determined using the tank strap chart or mathematical formula to the dispensed volume determined using the R ratios, the differential volumes per differential heights can be compared, (i.e., the dV/dh values), which is the first derivative of the volume as a function of height. This method may yield somewhat more accurate results because the curve associated with the differential volumes versus height is smoother than that for the curve of the volumes as a function of height. Furthermore, outliers, i.e., irregular data points, are more easily filtered out by comparing dV/dh rather than differential volumes.

In this alternate method, the R ratios are used to calculate the volume dispensed per unit of height change in each of the tanks ($(dV/dh)_{tank1}$ and $(dV/dh)_{tank2}$). This data is derived from the volume of liquid dispensed, dV, which is measured by the metering means during dispensing periods (or delivery periods) and opening and closing fuel heights, $h1_{open}$, $h1_{close}$, and $h2_{open}$, $h2_{close}$, measured by the sensors 26 and 27 during the various dispensing periods.

For any given dispensing period with an associated amount dispensed, $v_{meter}$, and opening and closing static fuel heights, $h1_{open}$, $h1_{close}$, $h2_{open}$, $h2_{close}$, for the two tanks, the following derivation illustrates how to create separate datum points for the tanks: set $$dh_{tank1} = h1_{open} - h1_{close},$$
$$dh_{tank2} = h2_{open} - h2_{close},$$
$$h_{eq}(busy) = \frac{h1_{open} + h1_{close} + h2_{open} + h2_{close}}{4},$$

then the unknowns $(dV/dh)_{tank1}$, $(dV/dh)_{tank2}$ can be found from the following two equations:

$$\frac{\left(\frac{dV}{dh}\right)_{tank1}}{\left(\frac{dV}{dh}\right)_{tank2}} = R(h_{eq}(busy)),$$

$$\left(\frac{dV}{dh}\right)_{tank1} * dh1 + \left(\frac{dV}{dh}\right)_{tank2} * dh2 = dV,$$

where $R(h_{eq}(busy))$ was generated by the coefficients of the function $R(h_{eq}(idle))$. The second equation of this system states that the amount dispensed, dV, was drawn from both tanks:

$$dV_{tank1} + dV_{tank2} = dV.$$

The solution of the system has the form $$\left(\frac{dv}{dh}\right)_{tank1} = \frac{v_{meter} * R(h_{eq})}{R(h_{eq}) * dh_{tank1} + dh_{tank2}},$$

$$\left(\frac{dv}{dh}\right)_{tank2} = \frac{v_{meter}}{R(h_{eq}) * dh_{tank1} + dh_{tank2}},$$

where $R(h_{eq}) = R(h_{eq}(busy))$. The separate calibration datum points are then generated by using the above multipliers on $v_{meter}$ for each tank.

Figure 4:
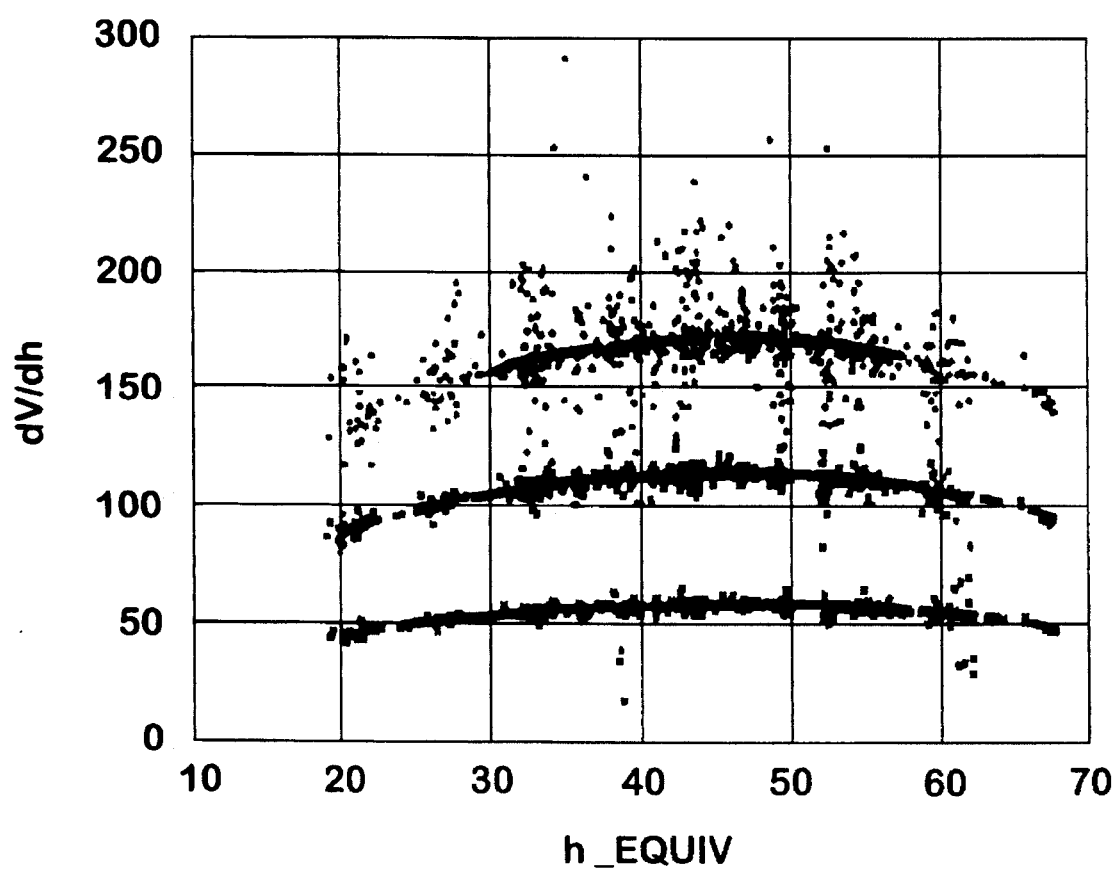
FIG. 4 is a graph of the dV/dh data points (differential volume per unit of differential height) as a function of equivalent height for each tank individually (the two lower clusters of data points) and for the combined tank (the upper cluster of data points).

As fuel is dispensed and the tanks are cycled, the separated datum points are accumulated in separate data sets and stored in the computer 32. This data can be curve fitted in much the same way as the ratio curve R(h) is. FIG. 4 is a graph of the data points $(dV/dh)_{composite}$ (the upper cluster); $(dV/dh)_{tank1}$ (the middle cluster); and $(dV/dh)_{tank2}$ (the lower cluster) as a function of $h_{eq}$. This data is then compared to the differential volumes per differential heights for each tank which are calculated using the formulas contained in Appendix C. The formulas contained in Appendix C are derived from the geometrical parameters of the tanks. The non-linear curve fitting routine is the same as described above with respect to the fitting the differential volumes.

Another alternate, but less accurate, method of calibrating the manifolded tanks 12 and 14 is to ignore how much fuel was supplied from each tank individually. Instead, a combined tank calibration could be created from the combined amounts dispensed. All that is needed is the total amount from both tanks combined. Therefore, an "equivalent" combined tank chart or combined mathematical formula may be generated using the metered amounts and a combined height amount. Heights from the two tanks may be simply averaged. This method may be applied to either the absolute volume formulas or the differential volume versus differential height formulas.

Figure 9:
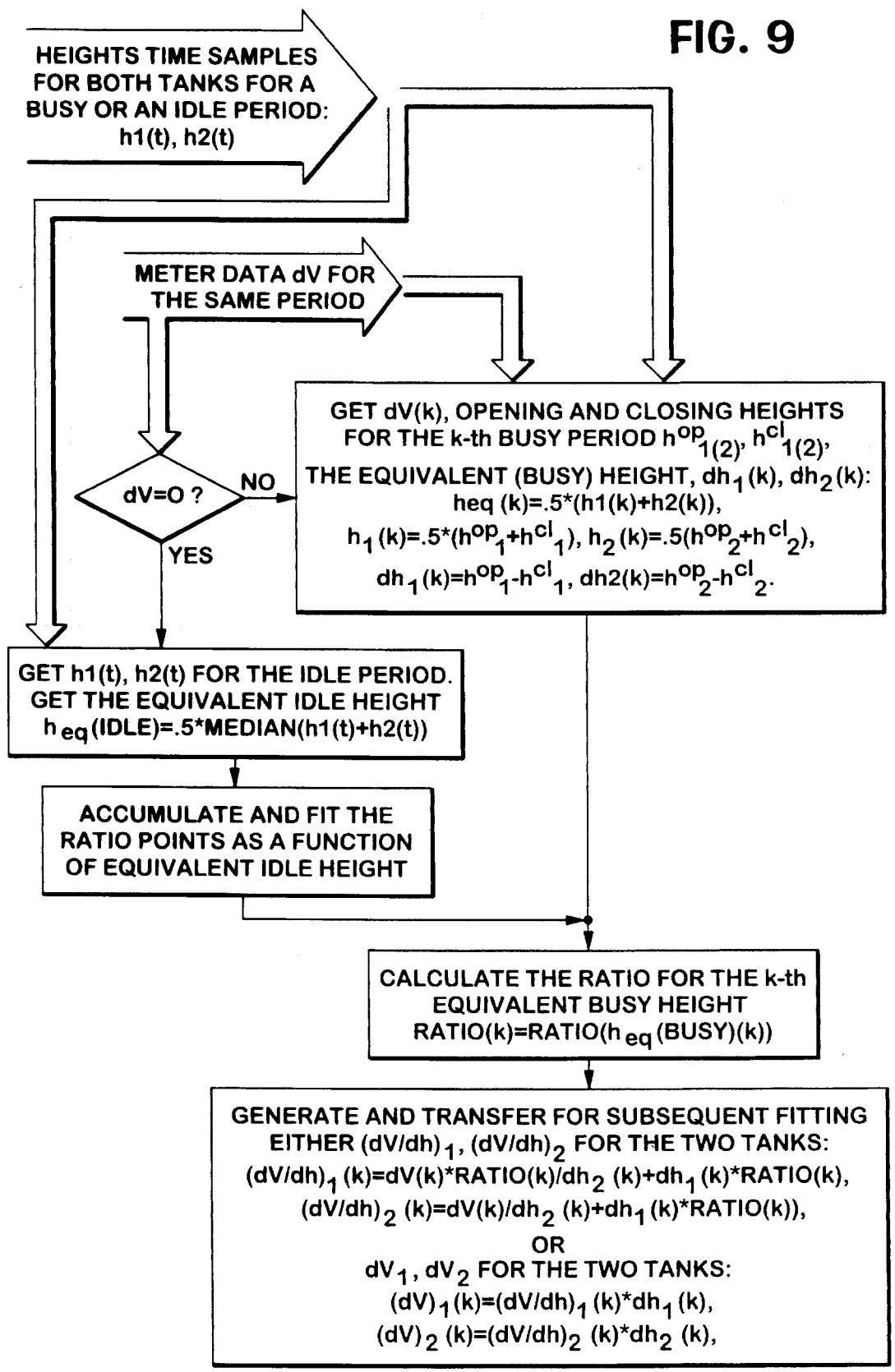
FIG. 9 is a flow diagram of the steps followed by a processor carrying out the calibration method according to the present invention.

A flow diagram is shown in FIG. 9 which illustrates the method steps performed by the processor in the computer 32 in calibrating the manifolded tanks 12 and 14 according to the present invention.

Those skilled in the art who now have the benefit of the present disclosure will appreciate that the present invention may take many forms and embodiments. Some embodiments have been described so as to give an understanding of the invention. It is intended that these embodiments should be illustrative, and not limiting of the present invention. Rather, it is intended that the invention cover all modifications, equivalents and alternatives falling within the spirit and scope of the invention as defined by the appended claims.

APPENDIX A

The ratio $(dV/dh)_1/(dV/dh)_2$ is a non-linear function of the equivalent idle height, as well as diameters ($D_1$, $D_2$), end shapes, offsets ($O_1$, $O_2$) and lengths ($L_1$, $L_2$) of the two tanks. For tanks having flat ends, this function has the form $$\text{ratio}^2 =$$

$$\frac{(dV/dh)_1^2}{(dV/dh)_2^2} = \frac{dh_2^2}{dh_1^2} = \frac{L_1^2}{L_2^2} \frac{(h_{eq} + O_1^*)(h_{eq} + O_1^* - D_1)}{(h_{eq} + O_2^*)(h_{eq} + O_2^* - D_2)},$$

where $O_1^* = O_1 + 0.5*\Delta h_s$, $O_2^* = O_2 - 0.5*\Delta h_s$. Even tanks having non-flat ends, the above function can, better than a straight line, reflect a drop or increase in the ratio as $h_{eq}$ approaches the top or the bottom of either of the tanks. Since ratio$^2$ is a non-linear function of the dimensions of the tank, a non-linear curve fitting routine is required. Depending on the resources available, the points can be also fitted by a straight line, with reduced accuracy near the top or the bottom of the tanks.

APPENDIX B

Volume of Fuel in a Liquid Storage Tank as a Function of Fuel Height

1. Volume of Fuel in a Tank With Zero Tilt

In this case $\alpha=0$ and the volume of the parts of the tank are as follows:

$$V_{middle}(h) = LR^2(acos(-x) + x\sqrt{1-x^2}),$$

$$x = \frac{(h_m - R)}{R},$$

$$V_{left}(h) + V_{right}(h) = \frac{\pi e}{3}(3R - h_m)h_m^2,$$

where $R=D/2$ is the radius of the tank, $h_m=h+O$ is the fuel height in the middle of the tank.

2. Volume of Fuel in a Tank With a Non-Zero Tilt

In this case, for $V_{middle}$ an exact formula is used, and for $V_{left}$ and $V_{right}$ an approximation for a segment of an ellipsoid is used, with the height taken as the average of the height at the end of the cylindrical part and the height at the intersection of the fuel surface with the ellipsoidal surface of the tank (respectively, $(h_L+h_+)/2$ or $(h_R+h)/2$). A case is called regular if the tilted fuel surface does not intersect the tank surface within its cylindrical part. If the case is not regular, the formulae are slightly modified. The procedure is based on the following formulae. First, $h_R$ and $h_L$ (FIG. 6) are determined:

$$h_L = h_m + \frac{L\tan\alpha}{2}, \quad h_R = h_m - \frac{L\tan\alpha}{2}.$$

Taking an offset into account, the meaningful values of $h_m$ are bounded by $$-\frac{L\tan\alpha}{2} \leq h_m \leq D + \frac{L\tan\alpha}{2}.$$

Figure 6:
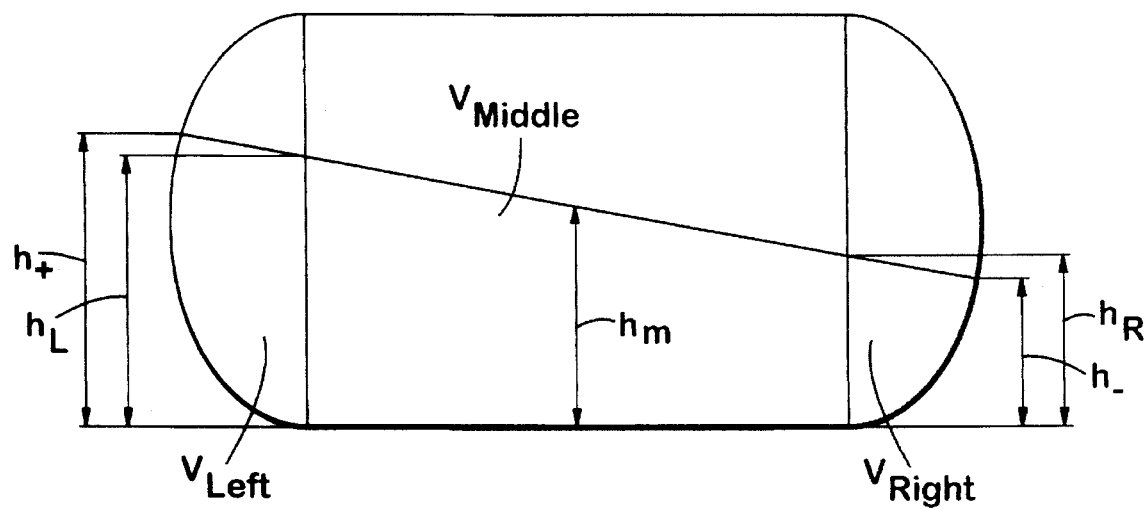
FIGS. 6–8 are diagrams of various liquid levels which may be present in a liquid storage tank having a non-zero tilt.

If $h_m$ is less or larger than these limits, the returned volume is, respectively, zero or full capacity, and the derivative $dV/dh$ is zero in both cases. If $h_L$ is not greater than D (diameter of the cylindrical part) and $h_R$ not less than zero, the case is regular (FIG. 6). For a regular case and a non-zero tilt, $$\frac{V_{middle}}{LR^2} = I(x_1, x_2) =$$

$$\frac{1}{x_2 - x_1} \int_{x_1}^{x_2} (acos(-x) + x\sqrt{1-x^2})dx =$$

$$\frac{1}{x_2 - x_1} \left\{ x_2 acos(-x_2) - x_1 acos(-x_1) + \sqrt{1-x_2^2} - \sqrt{1-x_1^2} + \frac{1}{3}[(1-x_1^2)^{3/2} - (1-x_2^2)^{3/2}] \right\},$$

where $x_1=(h_L-R)/R$, $x_2=(h_R-R)/R$, $R=D/2$ is the radius. $V_{left}$ and $V_{right}$ for the regular case are approximated, respectively, as $$V_{left}(h_{L0}) = \frac{\pi e}{6}(3R - h_{L0})h_{L0}^2, \quad (3)$$

$$V_{right}(h_{R0}) = \frac{\pi e}{6}(3R - h_{R0})h_{R0}^2, \quad (4)$$

where (FIG. 6) $h_{L0}=(h_L+h_+)/2$, $h_{R0}=(h_R+h)/2$, $$h_+ = h_L + x_L * \sin\alpha, \quad h_- = h_R - x_R * \sin\alpha,$$

$$x_L = (R - h_L) * \sin\alpha + \sqrt{(h_L - R)^2 * \sin^2\alpha + 2 * R * h_L - h_L^2},$$

$$x_R = (h_R - R) * \sin\alpha + \sqrt{(h_R - R)^2 * \sin^2\alpha + 2 * R * h_R - h_R^2}.$$

Figure 7:
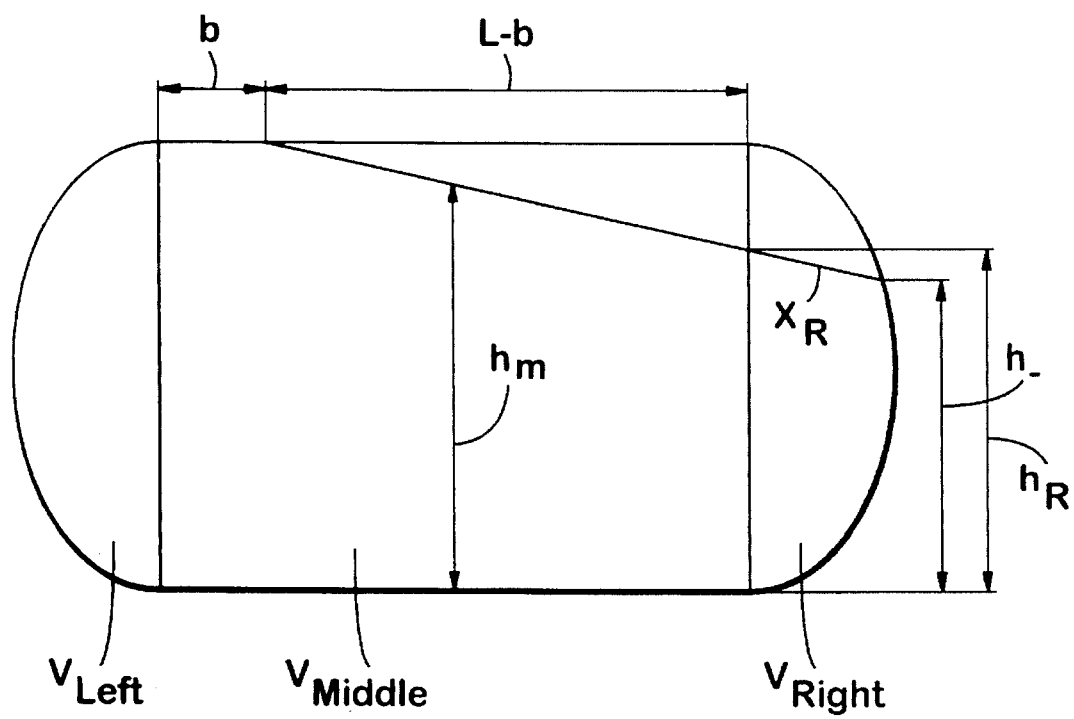
Figure 8:
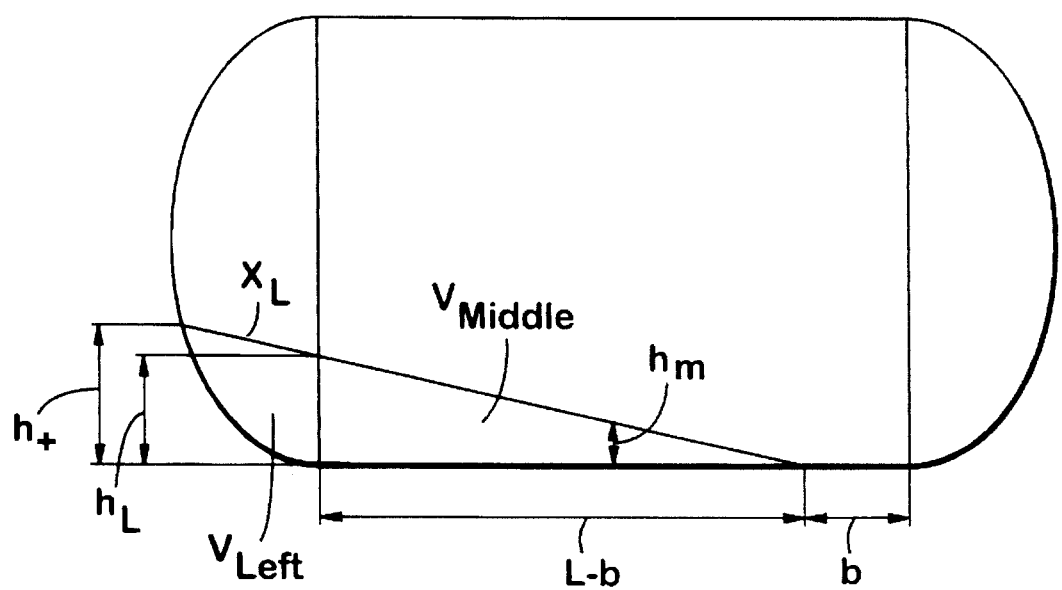

If a case is irregular (FIGS. 7 and 8), the following formulae apply. If $h_L>D$ (FIG. 7), then $$V_{left}=V_{left}(D), V_{right}=V_{right}(H_{R0}),$$

$$V_{middle}=\pi R^2 b + R^2(L-b)\cdot I(1,x_2),$$

$$b=L/2-(D-h_m)\cot\alpha.$$

If $h_R<0$ (FIG. 8), then $$V_{left}=V_{left}(h_{L0}), V_{right}=0$$

$$V_{middle}=R^2(L-b)\cdot I(x_1, 0),$$

$$b=L/2-h_m\cot\alpha.$$

APPENDIX C

Derivatives of Volume of Fuel in a Liquid Storage Tank With Respect to Fuel Height 1. Derivatives for a Tank With Zero Tilt The derivatives are $$\frac{\partial V_{middle}}{\partial h} = 2RL\sqrt{1-x^2},$$

where $$\frac{\partial V_{left}}{\partial h} + \frac{\partial V_{right}}{\partial h} = \pi e(Dh_m - h_m^2),$$

$$x = \frac{(h_m - R)}{R},$$

and $R=D/2$ is the radius of the tank and $h_m=h+O$ is the fuel height in the middle of the tank.

2. Derivatives for a Tank with Non-Zero Tilt

The derivatives $\partial V/\partial h$ for the regular case (FIG. 6) are expressed as follows.

$$\frac{\partial V_{middle}}{\partial h} = \frac{RL}{x_2 - x_1}(acos(-x_2) - acos(-x_1) + x_2\sqrt{1-x_2^2} - x_1\sqrt{1-x_1^2}),$$

where $x_1=(h_L-R)/R$, $x_2=(h_R-R)/R$.

Derivatives $\partial V_{left}/\partial h$, $\partial V_{right}/\partial h$ are approximated as $$\frac{\partial V_{left}}{\partial h} = \pi e \left( Rh_{L0} - \frac{h_{L0}^2}{2} \right), \frac{\partial V_{right}}{\partial h} = \pi e \left( Rh_{R0} - \frac{h_{R0}^2}{2} \right).$$

If a case is irregular (FIGS. 7, 8), the following formulae apply. If $h_L > D$ (FIG. 7), then $$\frac{\partial V_{middle}}{\partial h} = R^2 \left\{ \cot a[\pi - I(1, x_2)] + \frac{(L-b)}{R(x_2-1)} [-I(1, x_2) + a\cos(-x_2) + x_2 \sqrt{1-x_2^2}] \right\},$$

$\partial V_{left}/\partial h = 0$, $\partial V_{right}/\partial h$ is given by its regular expression, where $I(x_1, x_2)$ is defined in Appendix B, Section 2. If $h_R < 0$ (FIG. 8), then $$\frac{\partial V_{middle}}{\partial h} = R^2 \left\{ \cot aI(x_1, -1) + \frac{(L-b)}{R(x_1+1)} [-I(x_1, -1) + a\cos(-x_1) + x_1 \sqrt{1-x_1^2}] \right\}.$$

$\partial V_{right}/\partial h = 0$, $\partial V_{left}/\partial h$ is given by its regular expression.

What is claimed is:

1. An apparatus for calibrating manifolded liquid storage tanks, comprising:
   (a) sensors disposed within the tanks, said sensors sensing liquid levels in each of the tanks and providing first and second output signals;
   (b) at least one metering device for measuring the amount of liquid being dispensed into or out of the storage tanks and providing third output signals; and
   (c) a processor having first and second inputs for receiving said first and second output signals, and a third input for receiving said third output signals, said processor being operative:
      to store a first set of data values including a plurality of ratios of changes in liquid levels in one tank to associated changes in liquid levels in the other tank, said liquid levels used in determining said changes being measured by the sensors during a plurality of idle periods following associated dispensing periods and at a plurality of different liquid levels of the liquid in the tanks.

2. The apparatus according to claim 1, wherein the processor is further operative to determine the dimensions of the tank based on a second set of data values which represent the amount of liquid dispensed into or out of each tank during a plurality of dispensing periods, said processing means being programmed with an algorithm to compute the amount of liquid dispensed into or out of each tank based on liquid level measurements made immediately before dispensing and immediately following dispensing.

3. The apparatus according to claim 2, wherein said algorithm employs at least one mathematical expression for computing the volumes of the liquid in each of the tanks immediately prior to dispensing and immediately following dispensing, said computed volumes being used in determining the amount of liquid dispensed into or out of each tank during said dispensing periods, and said at least one mathematical expression being based on the height of liquid in the tanks at said plurality of dispensing periods and the dimensions of the tanks.

4. The apparatus according to claim 3, wherein the processor is further operative to store a third set of data values corresponding to the amounts of liquid dispensed into or out of each tank during the plurality of dispensing periods, said third set of data values being determined using said ratios corresponding to the heights of liquid in the tanks at said plurality of dispensing periods.

5. The apparatus according to claim 1, wherein the processor is further operative to determine the dimensions of the tank based on a second set of data values which represent the differential amounts of liquid dispensed into or out of each tank per unit of differential height change during a plurality of dispensing periods, said processing means being programmed with an algorithm to compute the differential amounts of liquid dispensed into or out of each tank per unit of differential height change based on the liquid level measurements.

6. The apparatus according to claim 5, wherein said algorithm employs at least one mathematical expression for computing the amount of liquid dispensed into or out of each tank per unit of differential height, said mathematical expression being based on the height of the liquid in the tanks at said plurality of dispensing periods and dimensions of the tanks.

7. The apparatus according to claim 6, wherein the processor is further operative to store a third set of data values including a plurality of ratios of changes in volumes to associated changes in liquid levels for each tank, said liquid level measurements used in determining said associated changes being taken by the sensors during a corresponding plurality of dispensing periods, wherein each change in volume is a function of the change in liquid level ratio corresponding to the liquid level at or near which the change in volume is being determined and the amount of liquid dispensed which is measured by the at least one metering device during the dispensing period at which the change in volume is being determined.

8. An apparatus for calibrating manifolded tanks, comprising:
   (a) sensors disposed within the tanks, said sensors sensing liquid levels in each of the tanks and providing first and second output signals;
   (b) at least one metering device for measuring the amount of liquid being dispensed into or out of the storage tanks and providing third output signals;
   (c) a processor having first and second inputs for receiving said first and second output signals, and a third input for receiving said third output signals, said processor being operative:
      i. to determine the dimensions of the tanks based on a first set of data values which represent estimates of the amount of liquid dispensed into or out of the combined tank corresponding to measured liquid levels in the tanks as sensed by said sensors, said processor being programmed with an algorithm for computing said first data values from said first and second output signals; and
      ii. to store a second set of data values derived from said third output signals, said second set of data values corresponding with actual volumetric quantities of metered liquid, which volumetric quantities are related to said measured liquid levels.

9. The apparatus according to claim 8, wherein said algorithm employs at least one mathematical expression for computing said first data values from said measured liquid levels based on the dimensions of the tanks.

10. In a method of calibrating manifolded liquid storage tanks, said method comprising the step of:
    generating a first set of data values including a plurality of ratios of changes in liquid levels in one tank to associated changes in liquid levels in the other tank, said liquid levels used in determining said changes being measured during a plurality of idle periods following a corresponding plurality of dispensing periods and at a plurality of different liquid levels of the liquid in the tanks.

11. The method according to claim 10, further comprising the step of generating a second set of data values which represent estimates of the amount of liquid dispensed into or out of each tank during a plurality of dispensing periods, said step of generating said second set of data values being carried out using an algorithm to compute the amount of liquid dispensed into or out of each tank based on liquid level measurements made immediately before dispensing and immediately following dispensing.

12. The method according to claim 11, wherein said algorithm employs at least one mathematical expression for computing the volumes of the liquid in the tanks immediately prior to dispensing and immediately following dispensing, said volumes being used in determining the amount of liquid dispensed into or out of each tank, said mathematical expression being based on the height of the liquid in the tanks at said plurality of dispensing periods and the dimensions of the tanks.

13. The method according to claim 12, further comprising the step of generating a third set of data values corresponding to the amounts of liquid dispensed into or out of each tank during the plurality of dispensing periods, said third set of data values being determined using said ratios corresponding to the heights of the liquid in the tanks at said plurality of dispensing periods.

14. The method according to claim 10, further comprising the step of generating a second set of data values which represent estimates of the differential amount of liquid dispensed into or out of each tank per unit of differential height change during a plurality of dispensing periods, said step of generating said second set of data values using an algorithm to compute the differential amount of liquid dispensed into or out of each tank per unit of differential height based on liquid level measurements.

15. The method according to claim 14, wherein said algorithm employs at least one mathematical expression for computing the amount of liquid dispensed into or out of each tank per unit of differential height, said mathematical expression being based on the height of the liquid in the tanks at said plurality of dispensing periods and dimensions of the tanks.

16. The method according to claim 15, further comprising the step of generating a third set of data values including a plurality of ratios of changes in volumes to associated changes in liquid levels for each tank, said liquid level measurements used in determining said associated changes being taken during a corresponding plurality of dispensing periods, wherein each change in volume is a function of the change in liquid level ratio corresponding to the liquid level at or near which the change in volume is being determined and the amount of liquid dispensed which is measured by the metering means during the dispensing period at which the change in volume is being determined.

17. In a method of calibrating manifolded tanks, said method comprising the steps of:
   i. generating a first set of data values which represent estimates of the amount of liquid dispensed into or out of the combined tank corresponding to measured liquid levels in the tanks, said step of generating said first set of data values being carried out using algorithm for computing said first data values from said measured liquid levels; and
   ii. generating a second set of data values corresponding to the amount of liquid dispensed into or out of the combined tank as measured by a metering means, said second set of data values being related to said measured liquid levels.

18. The method according to claim 17, wherein said algorithm employs at least one mathematical expression for computing said first data values from said measured liquid levels based on the dimensions of the tanks.

* * * * *